United States Patent [19]

Pareja

[11] 4,242,063
[45] Dec. 30, 1980

[54] HIGH PRESSURE MULTI-CYLINDER PUMP

[75] Inventor: Ramon Pareja, Minneapolis, Minn.

[73] Assignee: Lear Siegler, Inc., Santa Monica, Calif.

[21] Appl. No.: 48,021

[22] Filed: Jun. 13, 1979

Related U.S. Application Data

[62] Division of Ser. No. 856,341, Dec. 1, 1977, Pat. No. 4,184,817.

[51] Int. Cl.³ .................. F04B 21/02; F04B 39/10
[52] U.S. Cl. .................................. 417/571; 417/454; 417/539
[58] Field of Search ................ 417/533, 539, 571, 454

[56] References Cited

U.S. PATENT DOCUMENTS

| | | | |
|---|---|---|---|
| 3,413,929 | 12/1968 | Cook et al. | 417/273 |
| 3,431,865 | 3/1969 | Cook et al. | 417/571 |
| 3,666,382 | 5/1972 | Rasmussen | 417/533 |
| 3,746,483 | 7/1973 | Headel | 417/571 |
| 4,032,263 | 6/1977 | Pareja | 417/539 |

*Primary Examiner*—William L. Freeh
*Attorney, Agent, or Firm*—Orrin M. Haugen; Thomas J. Nikolai

[57] ABSTRACT

A multi-cylinder pump for delivering fluids under high pressure which includes a multi-lobed camshaft having bearing supported yoke elements disposed in an oil-filled crankcase for coupling the camshaft to plural piston elements such that displacement of the plural piston elements occur in a desired phase relationship and improved sealing arrangements disposed between the piston and the cylinders, between the suction inlet port and the high pressure outlet port and between the cylinders and the oil-filled crankcase to prevent cross-contamination of the oil lubricant and the fluid being pumped and to prevent any substantial leakage between the high pressure outlet port and low pressure inlet port during the suction and pressure strokes of the pistons.

4 Claims, 2 Drawing Figures

HIGH PRESSURE MULTI-CYLINDER PUMP

This is a division of application Ser. No. 856,341, filed Dec. 1, 1977 now U.S. Pat. No. 4,184,817.

BACKGROUND OF THE INVENTION

I. Field of the Invention

This invention relates generally to fluid handling apparatus and more specifically to the improved design of a multi-piston/cylinder pump for delivering fluids at relatively high pressure, the pump being designed for ease of assembly and subsequent repair, all as will be set forth in greater particularity hereinbelow.

II. Description of the Prior Art

Multi-piston pumps, as such, are known in the art. Typical are the structures set forth in the Dunn et al U.S. Pat. No. 3,747,478 and the Pareja U.S. Pat. No. 4,032,263 which are each assigned to the same assignee as the instant invention. Each of these patents describes a high pressure, three-cylinder pump in which a three-lobed cam shaft is disposed in an oilfilled crankcase in cooperative driving relationship with the pistons to provide pressure strokes thereto in a desired phase relationship, the suction stroke of the piston being provided by return springs disposed between a member secured to the cylinder housing and the pistons, which maintain the ends of the pistons in contact with the lobes on the camshaft. Since these springs are repetitively compressed and allowed to expand at a frequency determined by the angular velocity of the camshaft, they are subject to fatigue failure after prolonged use.

These prior art structures further include sealing means disposed between the cylinder walls and the pistons to prevent leakage of the fluid being pumped between the cylinder walls and the pistons during the pressure strokes. Since there must necessarily be relative motion between the pistons and the seals, the seals are the most vulnerable part of the pump as far as wear and attendant repair is concerned.

SUMMARY OF THE INVENTION

In accordance with the teachings of the present invention, the aforementioned parts which are most subject to wear and failure have been modified to eliminate them in the case of the piston return springs and redesigned in the case of the sealing arrangements, the redesign of the sealing arrangements being such that their normal life is greatly extended over that which was achievable in the prior art. Specifically, instead of employing piston return springs to provide the suction stroke of the pump, a novel yoke arrangement is provided to effect reciprocating motion of the pistons in a desired phase relationship without the use of piston return springs. In this arrangement, roller bearings surround the eccentric cams on the camshaft and the outer race of the bearings have an annular notch formed therein for accepting first and second wear shoes which are located at opposed diametric positions with respect to the bearing race and in substantial axial alignment with the pump pistons. A substantially semi-circular yoke element joins the two wear shoes and is mechanically coupled to the piston element. Thus, as the drive shaft is rotated, the wear shoes ride in the groove in the bearing's outer race and because of the eccentricity of the camshaft, the piston is pushed and then pulled in a reciprocating manner by the action of the yoke assembly. Bi-directional motion is thereby obtained without the use of piston return springs.

Further, in accordance with the teachings of the present invention, the pump employs, for each cylinder, a coaxial inlet and outlet valve of the type described in the Pareja U.S. Pat. No. 4,032,263, the valve assembly being operatively disposed between the suction inlet port and the pressure outlet port of the pump. During the suction stroke, the fluid to be pumped is drawn into the cylinder through a poppet valve and during the pressure stroke, this poppet valve closes and an annular ring valve (also part of the assembly) opens to pass the fluid to the high pressure pump outlet port. Typically, the pumping system in which the present invention finds utility may be working to deliver fluids at a pressure of around 3,000 psi. As such, the sealing arrangements surrounding the pistons are subjected to relatively high pressures and they must withstand these pressures over prolonged periods of use without substantial wear and deterioration.

One of the primary faults with known prior art piston seals is that they are subject to extrusion under high working pressures. Then too, it is necessary that the seals be self-lubricating in order to survive the frictional forces normally found in piston-type pumps.

In accordance with the teachings of the present invention, the primary seal which is disposed about the piston in each of the cylinders between the high and low pressure chambers is comprised of a annular cup seal containing an O-ring spreader and a Teflon backing ring supporting same, the combination being held in an operative position with respect to the reciprocating piston by means of first and second overlapping metal collars. It has been found that this arrangement prevents extrusion of the flexible cup seal while permitting controlled leakage to ensure proper lubrication of the working surfaces of the seal. Further, ports are provided in one of the seal supporting collar members, the ports communicating between the low pressure input port and the sides of the cylinder wall to pick up the controlled leakage and return it along with the incoming fluid to the pumping chamber during a subsequent suction stroke.

The sealing arrangement also includes a secondary assembly disposed between the oil-filled crankcase and the cylinder heads to prevent cross-contamination of the oil and the fluid being pumped. This secondary assembly includes a metal chimney member which is disposed in proximity to the junction between the crankcase and the cylinder head. The chimney member is provided with an internal annular bore in which is disposed first and second graphite rings and a flexible cup seal sandwiched therebetween. The graphite rings prevent extrusion of the cup seal member. The chimney member also includes a cylindrical projection which extends for a predetermined distance concentrically about the piston shaft in a non-contacting relationship. Secured to the shaft is a flexible skirt which overlaps the cylindrical projection on the chimney during the entire stroke of the piston. As such, a tortious path is established which aids in preventing cross-contamination of the crankcase oil and the fluid being pumped, any leakage in either direction being ported to the ambient.

Finally, the sealing arrangement of the present invention involves still a third seal which is disposed between the low pressure inlet port of the pump and a chamber communicating with the ambient. This third seal is also located in one of the overlapping collar members which form a part of the primary sealing structure and includes a flexible U-cup seal supported by a Teflon ring seal which, in turn, is supported by a concentric arrangement of an outer O-ring and an inner graphite ring, this last combination providing a vacuum seal to prevent air from entering into the cylinder's intake chamber. Again, lubrication of this third sealing arrangement is accomplished by means of a controlled leakage of the incoming fluid to be pumped along the side wall of the piston in the neighborhood of the sealing structures.

It is accordingly an object of the present invention to provide an improved multi-cylinder pump which is designed for simplicity in manufacture and repair.

It is another object of the invention to provide an improved multi-cylinder pump capable of delivering substantial volumes of fluid at relatively high pressures while still maintaining a relatively low frequency of repair.

Still another object of the invention is to provide an improved sealing arrangement for such a high capacity, high pressure pump.

It is yet still another object of the invention to provide an improved coupling between a rotatable camshaft and a piston such that the need for conventional piston return springs is obviated.

These and other objects of the invention will become apparent to those skilled in the art upon consideration of the accompanying specification, claims and drawings.

BRIEF DESCRIPTION OF THE DRAWINGS

Referring to the drawings, wherein like characters indicate like parts throughout the figures.

DESCRIPTION OF THE PREFERRED EMBODIMENT

Figure 1:
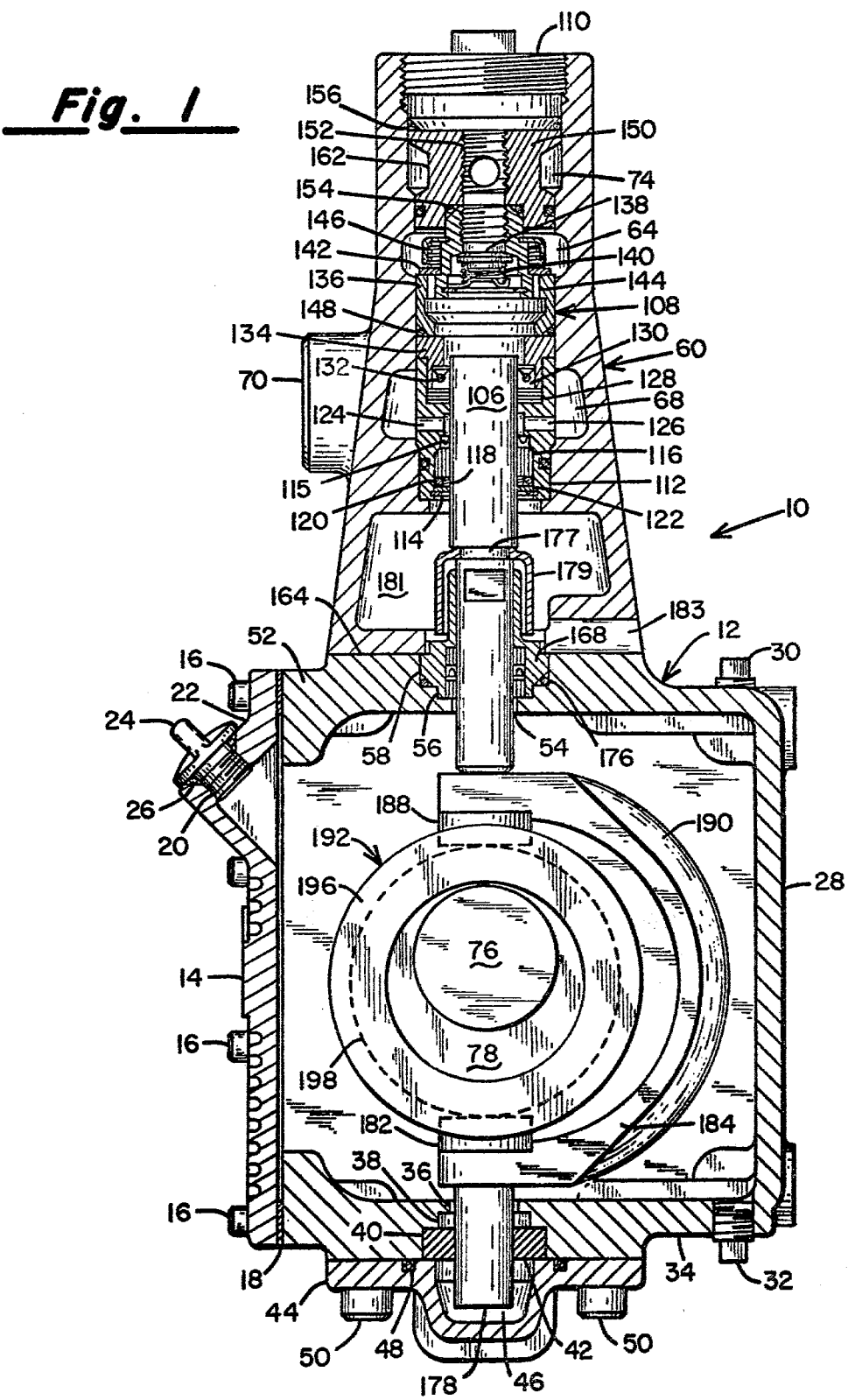
FIG. 1 is a cross-sectional, side elevation of a multi-piston pump.

Referring first to FIG. 1, there is indicated generally by numeral 10 a preferred embodiment of the multi-cylinder pump of the present invention. The pump housing comprises a crankcase casting 12 having a front plate 14 attached thereto by means of a plurality of Allen head bolts 16. Disposed between the open front face of the crankcase housing 12 and the cover plate 14 is a gasket-type seal 18. A bore 20 is formed in an inclined surface 22 of the front plate 14 and this bore is internally threaded to receive an oil-fill plug 24. An O-ring seal 26 surrounds the plug 24 and cooperates with a mating surface on the inclined portion 22 of the face plate 14 to effectively seal the opening to prevent oil from leaking therethrough.

Threaded bores are also provided in the top and bottom surfaces of the crankcase housing 12 at locations proximate to the rear face 28 thereof and these bores receive oil drain plugs 30 and 32 respectively. The reason that two drain plugs are provided is that the multi-cylinder pump of the present invention is designed to operate in either a vertical or horizontal position. When operating in its vertical position as illustrated in FIG. 1, the drain plug 32 may be removed to allow oil in the crankcase to be bled therefrom. When the pump is mounted for horizontal operation, the crankcase oil may be drained by removing either plug 30 or plug 32. The fact that the oil fill bore 20 formed in the face plate 14 is inclined facilitates the crankcase filling operation when the pump assembly is in either of its vertical or horizontal mounting positions. Axially disposed in the bottom wall 34 of the camshaft housing 12 is a cylindrical bore 36 and first and second counter bores 38 and 40. A cylindrical sleeve bearing 42 is disposed in the second counter bore. A bottom plate 44 having a generally U-shaped channel 46 integrally formed therein is adapted to be secured to the bottom surface 34 of the crankcase housing 12 and, again, an O-ring seal 48 surrounds the opening to the channel 46 to prevent seepage of oil out of the channel 46 to the ambient. Again, Allen head bolts 50 are employed to secure the bottom plate 44 to the crankcase housing 12.

Figure 2:
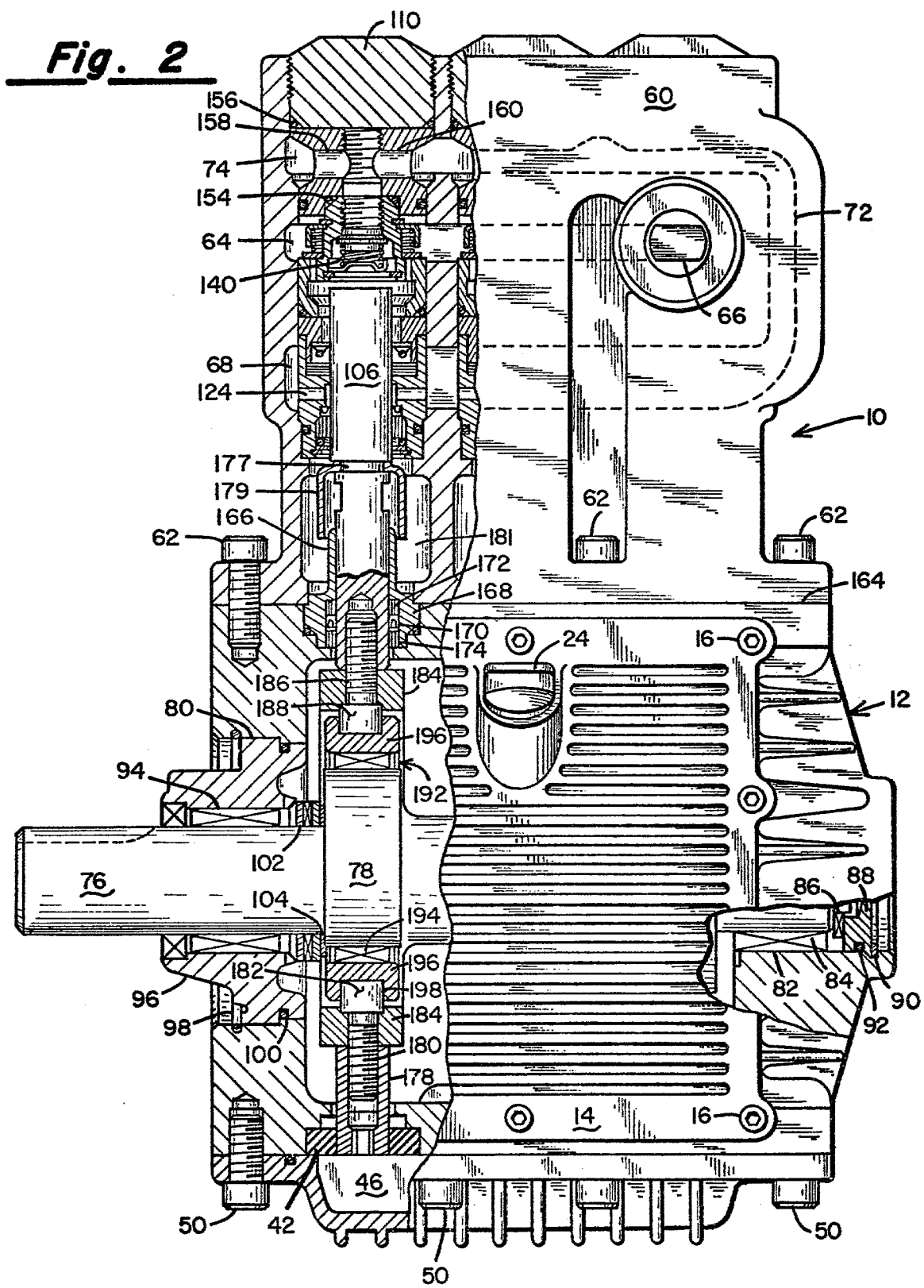
FIG. 2 is a front view of the multi-cylinder pump of FIG. 1 with portions thereof cut away and cross-sectioned to illustrate the working parts thereof.

Formed in the upper surface 52 of the crankcase housing 12 is a bore 54 and first and second counter bores 56 and 58. The bore 54 is generally axially aligned with the bore 36 formed in the lower surface 34 of the crankcase housing 12. Secured to the outer face of the upper surface 52 of the crankcase housing 12 is a cylinder head indicated generally by numeral 60. With reference to FIG. 2, the cylinder head 60 is secured to the camshaft housing 12 by means of bolts 62.

The casting comprising the cylinder head 60 includes a plurality of axial bores extending vertically therethrough, there being one such axial bore for each of the pistons in the multi-cylinder pump. Also formed in the cylinder head casting 60 are a plurality of channels or passages which extend generally transverse to the axial cylinder bores. More specifically, a transverse passageway 64 is provided which communicates with the high pressure fluid outlet port 66 formed in the front face of the cylinder head 60 (FIG. 2). Likewise, a transverse channel 68 is formed in the cylinder head casting 60 and this passageway surrounds all of the cylinders and communicates with the low pressure fluid inlet port 70. As is indicated by the dashed lines 72 in FIG. 2, the passageway 68 also communicates with an upper suction chamber 74 surrounding each of the cylinder positions, all as will be further described hereinbelow.

With reference to FIG. 2, it can be seen that the pump 10 further includes a drive shaft 76 which is journaled for rotation in the camshaft housing 12. The camshaft 76 has a plurality of integrally formed cylindrical lobes 78, there being one such lobe for each cylinder in the multi-cylinder pump configuration. The centers of the cylindrical lobes 78 are eccentric with respect to the axis of the shaft 76 and the direction of eccentricity is such that the pump pistons will be reciprocated in a desired phase relationship with respect to one another. Specifically, for a three cylinder pump as illustrated, the directions of eccentricity of the three cylindrical lobes will be offset from one another by 120°.

The manner in which the camshaft 76 is mounted for rotation within the camshaft housing 12 will now be described. As can best be seen in the frontal view of FIG. 2, first and second radial bores 80 and 82 are respectively formed in the left and right sides of the crankcase housing 12. Disposed within the bore 82 is a roller bearing assembly 84 which surrounds the right end of the shaft 76. A cylindrical thrust bearing 86 is disposed between the end surface of the shaft 76 and a thrust bearing retainer plug 88 is inserted into a circular opening in the housing 12 and held in place by means of a snap ring 90. An O-ring 92 is disposed in a circumferential notch formed in the thrust bearing retainer plug 88 and provides a seal between the plug 88 and the bore 82 to prevent oil contained in the camshaft housing from seeping out therefrom.

In a similar fashion, the left end of the drive shaft 76 is supported by a second set of main bearings 94 which are disposed in a cylindrical recess formed in a shaft collar 96. The collar 96 is retained within the bore 80 formed in the left end of the crankcase housing 12 by means of a snap ring 98. Again, an O-ring seal 100 is disposed in an annular recess or notch formed in the collar 96 to preclude the flow of oil from the crankcase to the ambient. A thrust bearing assembly 102 surrounds the shaft 76 and is disposed between an inner face of the collar 96 and the leftmost edge of the cam lobe 78. A wave spring 104 is provided for applying an axial force to hold the thrust bearing 102 into engagement with the end surface of the collar 96 and also to urge the right end surface of the shaft 76 against the thrust bearing assembly 86.

Before describing the unique piston driving assembly utilized in the present invention, consideration will be given to the various parts disposed in the cylinder chambers of the cylinder head 60. As was earlier indicated, a plurality of axial bores (one for each cylinder) are formed longitudinally through the cylinder head casting 60. With reference to FIG. 1, which shows a cross-sectional view taken through the rightmost cylinder in FIG. 2, there is shown a plunger or piston element 106 which is concentrically disposed within the generally cylindrical bore indicated generally by numeral 108. Surrounding the cylindrical piston 106 and disposed between the circumferential surface thereof and the inner cylindrical wall of the bore 108 are a plurality of pieces which comprise the improved sealing arrangements. Shown at the top of the cylinder head 60 is a removable threaded plug 110 which covers an opening through which the various seal members are valve elements yet to be described may be inserted during initial manufacture or subsequent repair of the unit. In describing the various parts utilized, they will be considered in the order in which they would initially be assembled during manufacture.

First of all is included a lower cylindrical collar member 112. It is formed from a suitable metal, such as brass and has an annular notch in the lower inner surface thereof, into which is adapted to be fitted a snap ring 114. Before the snap ring is put in place, however, a flexible U-cup seal member 115, preferably formed from a suitable rubber material is inserted into an upper annular recess formed in the cylindrical collar member 112. Immediately below the U-cup seal member 115 and abutting same in a supporting relationship is a Graphite guide 116. Next, disposed below the guide ring 116 and supporting same within the counter bore formed in the lower end of the collar 112 is a concentric arrangement of a Teflon sleeve 118 and a flexible O-ring 120. Abutting the bottom surfaces of the O-ring 120 and the Teflon sleeve 118 is a brass washer 122. Once these parts have been inserted into the counter bore formed in the lower collar member 112, the snap ring 114 is fitted into the annular notch or recess formed in the lower end of the collar to hold the foregoing parts in a secure axial arrangement within the collar member 112.

Radial ports 124 and 126 are drilled or otherwise formed through the collar member 112 so as to communicate with the low pressure inlet chamber 68.

Formed in the upper end of the lower collar member 112 is a counter bore of a larger diameter than the diameter of the axial bore formed therethrough. A Teflon cup seal support ring 128 is first fitted into this upper counter bore and disposed on top of the ring 128 is another rubber cup seal element 130. An O-ring 132 is inserted into the annular recess of the flexible cup seal 130 and acts as a spreader therefor. Completing this seal arrangement is an upper cylindrical collar member 134, also formed from brass and having an outer diameter only slightly less than the diameter of the axial bore formed in the cylinder head 60 such that this second collar member may be inserted into the cylinder. The outer surface of this upper collar member 134 is recessed over a predetermined length thereof so that it may telescopically slide into the counter bore formed in the upper end of the lower cylindrical collar member 112. The upper collar member 134 has an inner diameter which is somewhat larger than the diameter of the piston 106 and a counter bore is formed in the lower end thereof of a diameter which is larger than the axial bore therethrough, but less than the outer diameter at the location of the aforementioned recess. Thus, the upper collar member 134 abuts the Teflon cup seal support ring 128 at its outer edge and at least partially encompasses the cup support seal 130 itself.

Next in order of assembly comes a coaxial inlet and outlet valve assembly indicated generally by the numeral 136. The valve assembly 136 is preferably of the type described in the aforereferenced Pareja U.S. Pat. No. 4,032,263 and, as such, includes a first poppet valve 138 which is normally held in a seating arrangement with a central or axial port by means of a compression spring 140. A second poppet valve in the form of an annular ring member 142 normally seals the ports 144—144 because of the action of a second compression-type spring 146 acting thereon. Further details of the construction and mode of operation of the coaxial inlet and outlet valve assembly can be had be referring to the aforereferenced Pareja Patent. It is to be noted that the lower end of the valve housing abuts the upper surface of the collar member 134 and an O-ring 148 is disposed therebetween and in a sealing engagement with the cylinder walls 108.

Disposed on top of the coaxial inlet-outlet valve 136 is a so-called lantern element 150. The lantern 150 has a longitudinal bore 152 formed therethrough which is internally threaded so as to facilitate removal of the lantern element during servicing. Bores 158 and 160 are formed through the lantern member 150. An annular groove 162 is formed in the cylindrical side surfaces of the lantern element 150 and form one of the side walls of the suction chamber 74 formed in the inner surface of the cylinder head casting 60.

As is illustrated in FIG. 1, O-ring type seals 154 and 156 are located between the inlet to the coaxial valve 136 and the lantern member 150, between the lantern element 150 and the side walls of the cylinder head and between the lantern 150 and the threaded plug 110, respectively, to prevent fluid leakage between these respective mating surfaces.

A second sealing means concentrically surrounds a lower portion of the piston 106 and is disposed generally in the area of the joint 164 between the upper surface of the camshaft housing 12 and the cylinder head casting 60. More specifically, a cylindrical sleeve or chimney 166 (FIG. 2), having an axial bore formed longitudinally therethrough of a diameter greater than that of the shaft 106 which it surrounds, has an integrally formed base 168 extending outwardly from the sleeve 166 and a concentric bore is formed in the base 168, extending inwardly, which is of a diameter greater than the diameter of the axial bore 54 formed in the upper surface of the camshaft housing 12. The base 168 of the cylindrical sleeve 166 is therefore disposed in a recess 58 formed in the upper wall of the crankcase housing. An oil impervious, tubular, U-cup seal member 170 is sandwiched between first and second graphite sleeves 172 and 174 which act as support rings for the flexible U-cup seal member 170. These last named elements surround the shaft 106 and are disposed in the oversized concentric bore formed in the lower end of the base 168 of the sleeve 166. A conventional O-ring seal member 176 is placed between the chamfered edge of the base 168 and the side walls of the counter bore 58 formed in the upper surface of the camshaft housing 12.

Formed in the shaft 106 is an annular groove 177 into which is fitted a flexible skirt member 179 which may be formed from rubber or other equivalent material. The skirt is flared outwardly from the shaft 106 and is opened at its bottom so as to at least partially surround the upwardly projecting sleeve 166 during the entire travel of the piston. The overlapping sections of the skirt 179 and the sleeve 166 are generally disposed within a chamber 181 formed in the cylinder head casting 60, which chamber is provided with a weep slot 183 which vents to the ambient.

Now that the unique sealing arrangements of the present invention have been described in detail, consideration will be given to the novel piston driving arrangement utilized in the preferred embodiment.

Passing through the guide bearing 40 and into the chamber 46 formed in the bottom plate 44 is a lower guide rod 178. As can best be seen in the cross-sectional view of FIG. 2, the guide rod 178 is tubular in construction and is provided with internal threads into which is screwed a bolt 180 having a generally rectangular head 182. The shaft of the bolt 180 passes through a clearance hole formed in the bottom of a generally C-shaped or semicircular yoke member 184 and is restrained from rotation by a notch formed in the inner surface of the yoke 184 which mates with the rectangular head 182 of the bolt. In a similar fashion, a second bolt 186 passes through a hole formed in the upper end of the C-shaped yoke member 184 and engages a threaded bore formed in the bottom of the cylindrical piston 106. The bolt 186 also has a generally rectangular head 188 which is partially recessed within a notch formed on the inner surface of the yoke member 184 in proximity to the hole through which the bolt 186 passes.

As can best be seen from the view of FIG. 1, the C-shaped yoke member 184 is generally semi-circular and couples the lower guide pin 178 to the piston 106. For added strength, the yoke member 184 may have an integrally formed web 190 along its outer periphery.

Surrounding the eccentric lobes 78 on the camshaft is a cam bearing indicated generally by numeral 192. The cam bearing assembly includes a plurality of roller bearings 194 which are surrounded and held by an outer race 196. The outer race 196 is provided with an annular rectangular groove 198 which the rectangular bolt heads 182 and 188 ride. Hence, the bolt heads 182 and 188 comprise replaceable wear bars.

Again, each of the lobes 78 on the camshaft 76 is provided with a similar arrangement of a notched cam bearing, and associated wear pins and yoke members which cooperate with all of the pistons utilized in the multi-piston pump 10.

Now that the details of the construction of the preferred embodiment have been set forth, consideration will be given to the mode of operation thereof.

OPERATION

As the drive shaft 76 is rotated in either the clockwise or the counterclockwise direction, the pistons 106 will be displaced back and forth in a straight line reciprocating fashion in a desired phase relationship through the conjoint action of the cam shaft lobes 78, the cam bearing assembly 192, the C-shaped yoke member 184 and the wear bars 182 and 188. The pistons or plungers 106 are positively pushed and positively pulled back and forth by their yoke connections with their associated cam bearings and the need for piston return springs commonly found in prior art pumps of the type described is obviated.

For proper lubrication, the camshaft housing is partially filled with a suitable lubricating oil. Because of the size of the bore 36 and the counter bore 38 formed in the bottom surface of the camshaft housing 12 with respect to the diameter of the guide pin 178, lubricating oil reaches the guide bearing 40 and seeps between it and the shaft of the guide pin 178 and into the recess formed in the bottom plate 44, thus ensuring proper lubrication of these mating parts.

Lubricating oil also seeps through the bore 54 in the top surface of the crankcase housing 12 and along the piston shaft 106 so as to lubricate the cup seal 170. The seal, however, effectively, limits oil seepage above that point. The coaction of the inner side walls of the base 168 of the chimney or sleeve 166 and the graphite seal support rings 172 and 174 prevents extrusion of the cup seal 170 along the piston shaft, thus ensuring longer life to the cup seal 170. With time, however, the cup seal 170 will be expected to wear such that small quantities of lubricating oil may seep upward past the seal and over the upper end of the sleeve 166. The skirt 179, however, effectively blocks further upward displacement of leaking lubricating oil and it will find its way to the bottom of the chamber 181 and will be vented to the ambient by way of the weep slot 183.

During the downward or suction stroke of a piston 106, the fluid to be pumped is drawn in through the inlet port 70, into the chamber 68 and through the channel 72 to the suction chamber 74 of the pump. This incoming fluid passes through the ports 158 and 160 and acts in opposition to the spring 140 of the poppet valve 138 to cause the poppet valve to open, allowing the fluid to be drawn into the pumping chamber. Once this chamber is filled, and the upward or pressure stroke of the piston takes place, the increased pressure within the pumping chamber again causes the poppet valve 138 to seat, thereby preventing backflow through the inlet connection 70. The pressure exerted by the fluid during the pressure stroke causes the annular poppet element 142 of the coaxial inlet/outlet valve 136 to open such that the fluid under pressure passes through the ports 144 of the valve and into the high pressure chamber 64 which communicates with the pump outlet port 66. Again, during a subsequent suction stroke the annular poppet 142 closes and the poppet 138 opens to again fill the pumping chamber and the cycle repeats.

The pumping chamber defined by the walls of the unitary coaxial inlet/outlet valve is effectively isolated from the low pressure fluid input chamber 68 by means of the cup seal 130. During a pressure stroke of the piston, this seal is subjected to relatively high pressures, e.g., 3,000 psi, and would be subject to extrusion and wear, were it not for the presence of the Teflon cup seal support ring 128 which abuts the lower surface of the cup seal member 130. Also, the cup seal and Teflon support ring 128 are held firmly in place about the piston shaft 106 by means of the overlapping collar members 134 and 112. The flexible, rubber cup seal member 130 is lubricated, however, by the fluid being pumped. Any seepage from the pumping chamber beyond the seal 130 passes directly to the low pressure suction loop by way of the radial ports 124 and 126 provided in the lower collar member 112.

The suction inlet loop is effectively isolated from the chamber 181 which is at atmospheric pressure, by means of the sealing arrangement including the U-cup seal 115, its Graphite guide support ring 116, the Teflon sleeve 118 and concentric O-ring 120 and the brass washer 122, all of which are held in place within the counter bore of the lower collar element 112 by means of the snap ring 114. The cup seal 115 is effectively lubricated by means of the fluid being handled which is allowed to communicate with the seal 115 by way of the radial ports 124 and 126. Any fluid which may ultimately seep past the lower seal assembly enters the chamber 181 and exits therefrom by way of the weep slot 183. The overlapping skirt 179 and sleeve 166 inhibits the passage of the fluid being pumped along the piston shaft and past the seal arrangement including the cup seal 170 and seal support rings 172 and 174 such that the crankcase oil is not contaminated.

Multi-cylinder pumps made in accordance with the teachings of the present invention are capable of delivering fluids at relatively high pressures over long periods of time and with only nominal wear such that overhaul becomes necessary much less frequently than with prior art pump arrangements.

Another feature of the present invention which should be mentioned is that with only slight modification, the drive arrangement employed may be used to operate a second grouping of pumping pistons. Specifically, by removing the bottom plate 44, a cylinder head, identical to that described hereinbefore, may be attached to the bottom surface 34 of the crankcase housing 12 and the wear bars 182 may be connected to the additional set of pistons which would then operate through the bore 36 instead of the bottom guide rod 178. In such an arrangement, the guide bearing assembly 42 disposed in the counter bore 40 would be replaced with a seal assembly substantially identical to that contained within the counter bore 58 of the upper surface of the crankcase housing 12. Thus, a dual bank of pistons may be operated in phase opposition to the upper bank which is illustrated in the drawings.

While there has been shown and described a specific embodiment of this invention, further modifications and improvements may occur to those skilled in the art. Therefore it is to be understood that this invention is not limited to the particular form shown and it is intended that the appended claims should cover all modifications which do not depart from the spirit and scope of this invention.

What is claimed is:

1. In a fluid pumping apparatus of the type including a camshaft journaled for rotation in an oil containing crankcase, a head block having at least one piston chamber formed therein affixed to said crankcase, a piston member disposed in said piston chamber, means coupling said camshaft to said piston for imparting reciprocating motion thereto, and a unitary inlet/outlet valve disposed in said piston chamber between a low pressure fluid inlet port and a high pressure fluid outlet port, the improvement comprising:

(a) first sealing means disposed in said head block adjacent to said unitary inlet/outlet valve and concentrically surrounding a first portion of said piston during its entire travel, said first sealing means including;
  (1) a first cylindrical collar member abutting said unitary inlet/outlet valve having an axial bore therethrough of a diameter greater than the diameter of said first portion of said pistons; a counterbore of a diameter greater than said axial bore formed in one end thereof extending inwardly a predetermined distance and a cylindrical flange integrally formed at the other end thereof having a diameter greater than that of said counterbore to thereby form a shoulder;
  (2) a second cylindrical collar member having an axial bore therethrough of a diameter to provide a sliding fit with respect to said first portion of said piston, a counterbore formed in one end thereof and extending inwardly for a distance greater than the length of said first cylindrical collar member and of a diameter slightly greater than the diameter of said first cylindrical collar member such that said first collar member will fit within said counterbore formed in said one end of said second collar member with said one end of said second collar member abutting said shoulder, a first counterbore formed in the other end of said second cylindrical collar and extending inwardly for a predetermined distance and of a diameter greater than that of said axial bore and a second counterbore formed in said other end of said second cylindrical collar and extending inwardly for a distance less than said predetermined distance of said first counterbore formed in said other end of said second cylindrical collar;
  (3) a first flexible cylindrical, U-cup seal member disposed in said counterbore of said first cylindrical collar;
  (4) a first U-cup seal support ring disposed in said first counterbore formed in said one end of said second cylindrical collar and abutting said first U-cup seal member;
  (5) a second flexible, cylindrical U-cup seal member disposed in said first counterbore formed in said other end of said second cylindrical collar; and
  (6) a second U-cup seal support ring disposed in said second counterbore formed in said other end of said second cylindrical collar member and abutting said second U-cup seal member.

2. Apparatus as in claim 1 wherein said first sealing means further includes at least one opening extending radially through said second cylindrical collar and communicating with said second flexible, cylindrical U-cup seal member and with said low pressure fluid inlet port.

3. Apparatus as in claim 1 and further including second sealing means concentrically surrounding a second portion of said piston and disposed generally in the area of the joint between said crankcase and said block, said second sealing means comprising:

(a) a cylindrical sleeve having an axial bore formed longitudinally therethrough of a diameter greater than the diameter of said second portion of said piston and having an integrally formed base extending outwardly from said sleeve, there being a concentric bore in said base extending inwardly and of a diameter greater than the diameter of said axial bore, said base being disposed in a recess formed in the wall of said crankcase abutting said head block;
(b) an oil impervious, tubular, U-cup seal member surrounding said second portion of said piston and disposed within said concentric bore in said base; and
(c) first and second U-cup seal supporting rings surrounding said second portion of said piston and disposed on either side of and in abutting relationship with said tubular, U-cup seal member within said concentric bore in said base.

4. Apparatus as in claim 3 and further including a cup shaped skirt affixed to said piston at a location within said head block in proximity to the end of said cylindrical sleeve opposite said base and at least partially surrounding said sleeve during the entire travel of said piston.

* * * * *